United States Patent
Norman et al.

(10) Patent No.: US 6,714,284 B2
(45) Date of Patent: Mar. 30, 2004

(54) TRACK AND FIELD MEASURING APPARATUS AND METHOD

(76) Inventors: Richard Grant Norman, 7905 County Rd. 19 SE., Rochester, MN (US) 55904; James K. Hesch, 3530 Zafarano Dr., #6-456, Santa Fe, NM (US) 87505

(*) Notice: Subject to any disclaimer, the term of this patent is extended or adjusted under 35 U.S.C. 154(b) by 0 days.

(21) Appl. No.: 10/155,807

(22) Filed: May 24, 2002

(65) Prior Publication Data

US 2003/0016344 A1 Jan. 23, 2003

Related U.S. Application Data

(60) Provisional application No. 60/293,477, filed on May 25, 2001.

(51) Int. Cl.[7] .............................. G01C 3/08; G01C 3/00; G01B 11/26; A63B 63/00
(52) U.S. Cl. .................. 356/4.01; 356/3.01; 356/141.1; 356/4.08; 273/317
(58) Field of Search .............................. 356/4.08, 3.01, 356/141.1, 4.01; 273/317

(56) References Cited

U.S. PATENT DOCUMENTS

| | | | |
|---|---|---|---|
| 3,752,588 A | * | 8/1973 | Chapman |
| 4,954,837 A | * | 9/1990 | Baird et al. |
| 5,742,387 A | * | 4/1998 | Ammann |
| 6,095,928 A | * | 8/2000 | Goszyk |
| 6,266,628 B1 | | 7/2001 | Huep et al. |

FOREIGN PATENT DOCUMENTS

| | | |
|---|---|---|
| DE | 197 50 207 A1 | 7/1999 |
| DE | 199 22 341 A1 | 11/2000 |

* cited by examiner

Primary Examiner—Stephen C. Buczinski
(74) Attorney, Agent, or Firm—Merchant & Gould, P.C.

(57) ABSTRACT

The present invention relates to a distance measuring device for measuring athlete throws in a throwing event at a track and field meet. The device is setup in a position outside a throwing circle and a landing area for the event being measured and is aimed at a target placed at a landing position of a thrown object. The present invention also relates to a method of using a distance measuring device to measure athlete throws in a throwing event at a track and field meet from a position outside of a throwing area and a landing area for a event being measured by aiming the device at a target placed at the landing position of a thrown object. The present invention further relates to a method of using a laser distance measuring device to determine the height of a cross bar in a leaping event at a track and field meet.

19 Claims, 6 Drawing Sheets

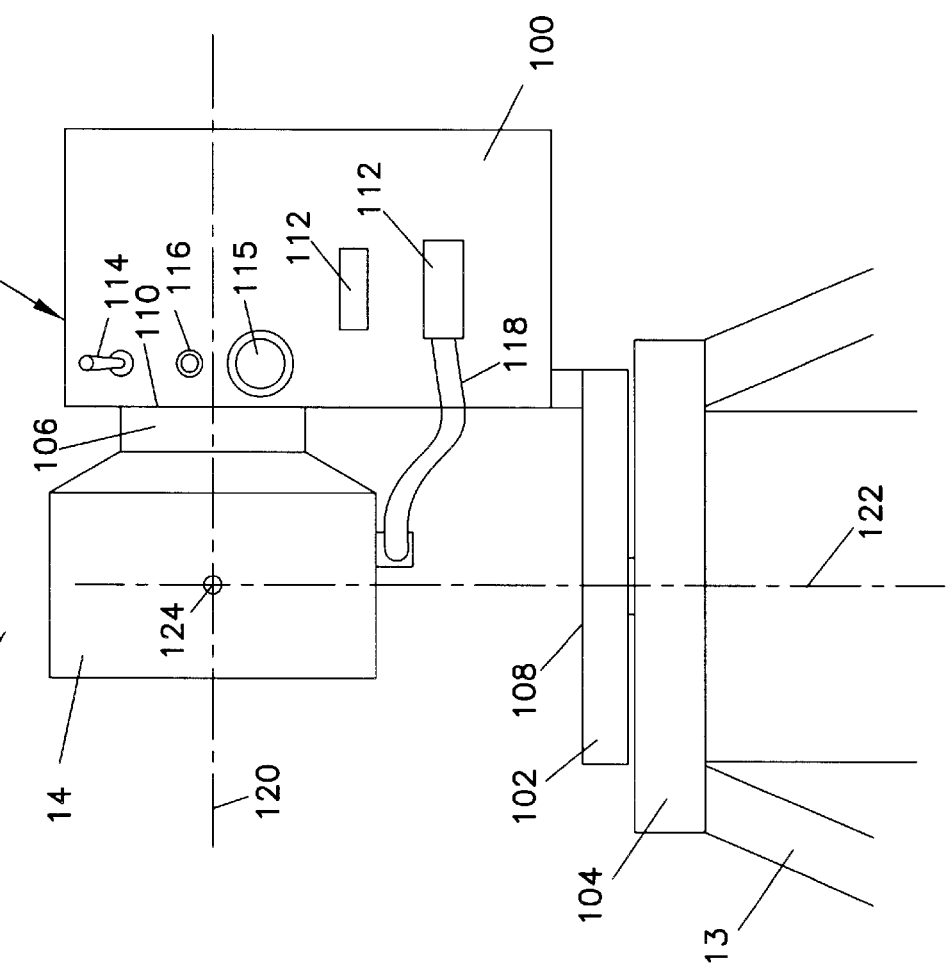

FIG. 6
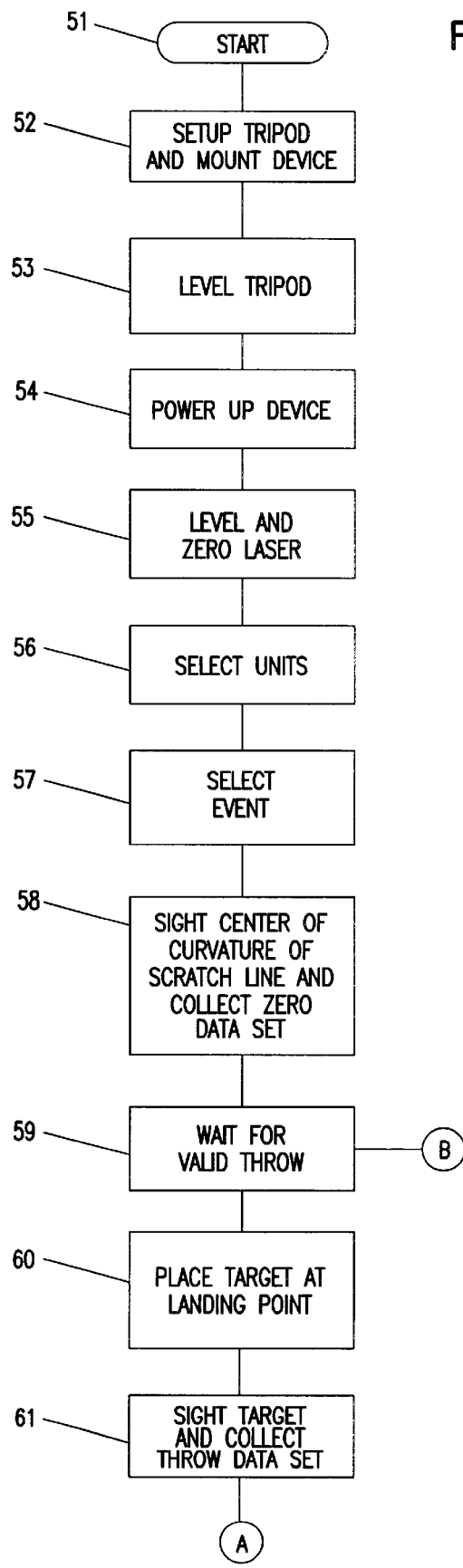
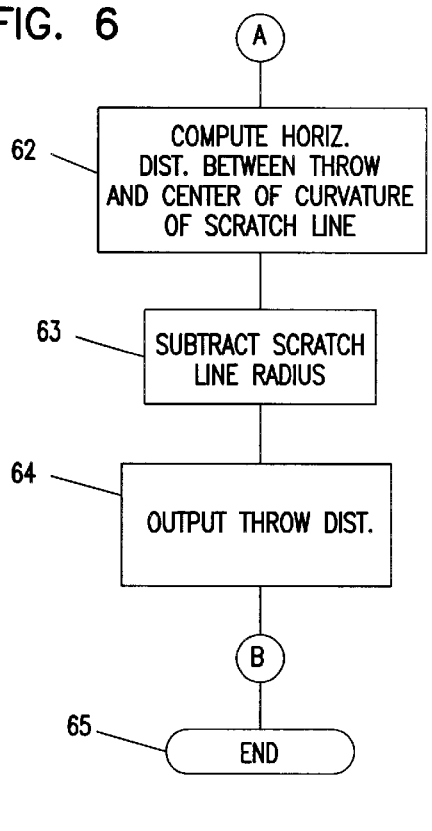

TRACK AND FIELD MEASURING APPARATUS AND METHOD

This application claims the benefit of provisional application 60/293,477 filed on May 25, 2001.

FIELD OF THE INVENTION

The present invention relates generally to measuring distances achieved by athletes competing in track and field events, and more particularly to a laser based system for accurately measuring throws in field events.

BACKGROUND OF THE INVENTION

In the sport of track and field, several of the field events are based on the distance that an athlete can throw an object. More specifically, in the javelin, the discuss, the shot put, and the hammer throw, the competitor that throws the object the farthest (with a legal throw) is considered the winner of that event. As used herein, the term thrown object will refer generically to the javelin, discuss, shot put and hammer. It will be understood, however, that while a device constructed in accordance with the principles of the present invention might be employed in measuring all of the events or any one of the individual events, it would not need to be utilized in connection with measuring all of the different events (or for that matter each of the throws in any one particular event) at any given competition or track meet.

Currently, the throws of each athlete, after being determined to be a legal throw, are physically measured with a tape measure. The measurement is based on the distance between the landing point of the thrown object and the edge of the throwing circle (or foul line of the javelin, etc.). In practice, the landing area may include pre-measured lines which are set at fixed distances from the edge of the throwing circle or foul line. If such pre-measured lines exist, then the measurement of the thrown object can occur from the landing point to the edge of a line. In practice, the line selected is the one which is: a) closest to the landing point of the thrown object and b) between the landing point and the area where the throw originated.

As will be appreciated, using such physical measurements introduces certain inaccuracies. For example, such inaccuracies may be due to improperly drawn pre-measured lines and/or improper offset (e.g., measurements which are not taken along the normal to the tangent—at the proper point on the pre-measured line). Also, the physical tape measure can be read improperly, can be kinked or otherwise not properly stretched between the two measurement points.

Based on the above, it will be appreciated that there exists a need for an improved apparatus and method for measuring distances in the sport of track and field. The present invention overcomes the drawbacks of the prior art identified above.

SUMMARY OF THE PRESENT INVENTION

The present invention provides for an apparatus and method for measuring distances in the thrown object events in the sport of track and field. A laser based measuring device is used in connection with a marker having a target area. The measuring device is placed at a point proximate where the competitor releases the thrown object. The marker is placed at the point where the thrown object lands. Assuming that the throw is a valid throw (e.g., the competitor does not foul, the throw lands within the legal landing area, etc.), then the present invention may rapidly acquire a highly accurate measurement.

One feature of the present invention is that the measuring device can be set up in a position offset from throwing circle and the landing area and be programmed to subtract the radius of the throwing circle in determining the distance of the throw.

Therefore, according to one aspect of the invention, there is provided a method for measuring distances in track events, the steps comprising: placing a marker at the point where a thrown object in the field event lands; pointing a target located on the marker toward a laser measuring device which positioned offset from the area where the throw originated; aligning the laser distance measuring device with the target; and determining the horizontal distance of the thrown object from the area where the throw originated.

According to other aspects of the invention, there is provided a method in accordance with the preceding paragraph and further comprising the step of calculating the distance from the center of curvature of a scratch line and subtracting the radius of the scratch line from the calculated horizontal distance to determine the distance from the scratch line to the landing point of the thrown object.

According to another aspect of the invention, there is provided, an apparatus for measuring distances in throwing events such as at track and field meets, the apparatus comprising: a marker, the marker having a target located thereon; a laser distance measuring device arranged and configured to be placed in a position offset from the area where the throw originated; wherein the laser distance measuring device may be aligned with the target and determine the length of the distance that an athlete throws a thrown object.

According to still other aspects of the invention, there is provided an apparatus in accordance with the preceding paragraph, wherein the measuring device calculates the distance the thrown object is thrown from the center of curvature of a scratch line and subtracts the radius of the scratch line from the calculated horizontal distance to determine the distance from the scratch line to the landing point of the thrown object.

While the invention will be described with respect to a preferred embodiment configuration and with respect to particular devices used therein, it will be understood that the invention is not to be construed as limited by the components described herein. Also, while the particular type of laser measuring device is described in the preferred embodiment, it will be understood that such particular device is not to be construed in a limiting manner. Instead, the functionality of such device should be appreciated. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawing which forms a part hereof and to the accompanying descriptive matter, in which there is illustrated and described a preferred embodiment of the invention.

BRIEF DESCRIPTION OF DRAWINGS

Referring to the drawing, wherein like numerals represent like parts throughout the several views:

FIG. 4 is a first view of a laser measuring device used in the environment of the present invention.

FIG. 5 is a second view of the laser measuring device of FIG. 4, with the tripod and measuring instrument removed.

FIG. 6 is a logic flow diagram illustrating the steps used to measure the competitors' throws in a field event utilizing the principles of the present invention.

DETAILED DESCRIPTION OF THE INVENTION

Figure 1:
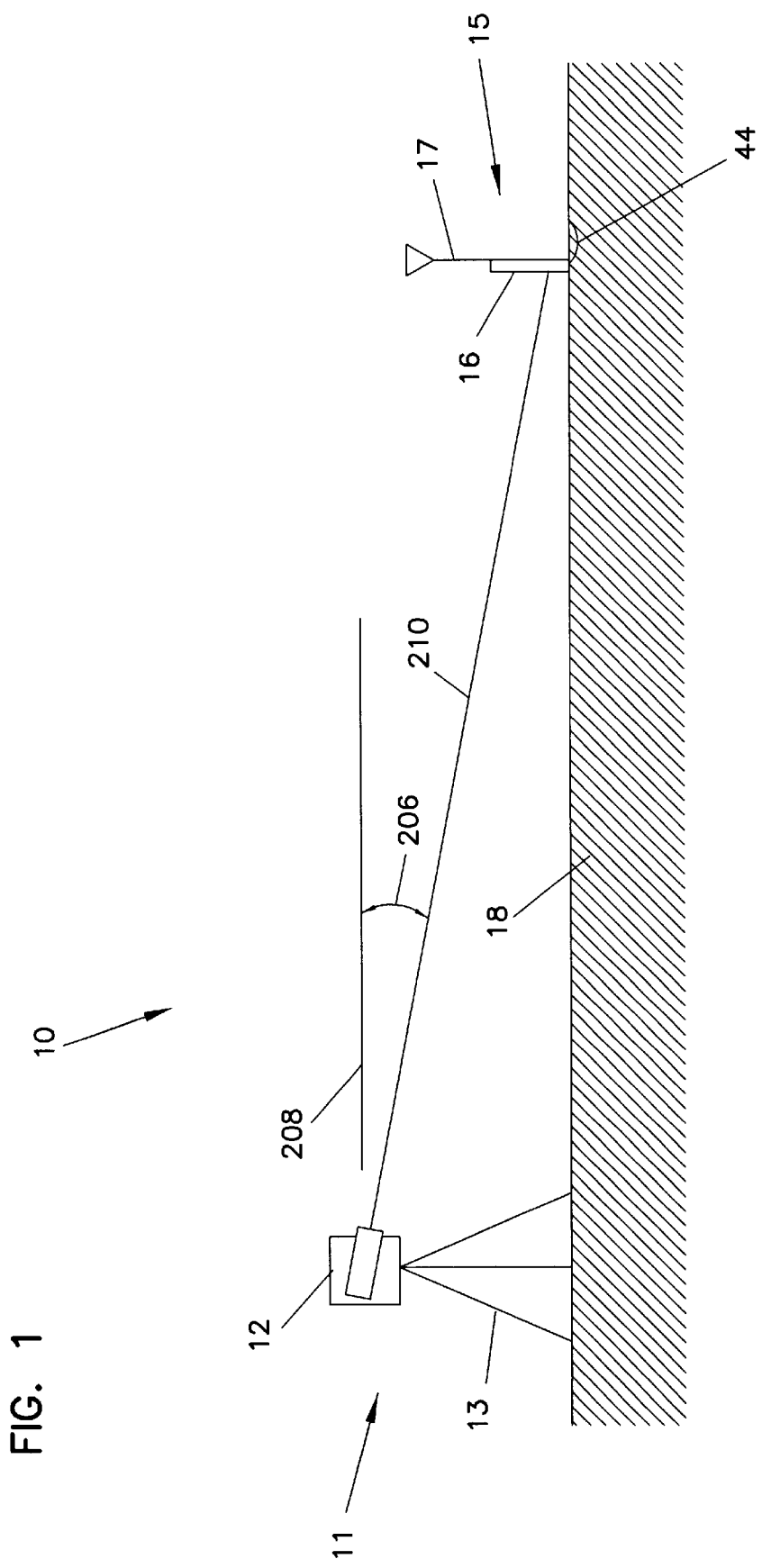
FIG. 1 is a block diagram of a laser measuring device used in the environment of the present invention.

A device constructed in accordance with the principles of the present invention can preferably be used for determining distances which athletes throw or hurl thrown objects in a competition. Turning now to FIG. 1, there is illustrated in functional block form the components and operation of a laser based distance measuring device constructed in accordance with the principles of the present invention. The system is shown generally by the designation 10.

The system is generally comprised of a target device 15 and measuring device 11. The measuring device 11 is comprised of an electronic device 12 which utilizes a laser or other coherent light based measurement system and a stand or tripod 13.

In the preferred embodiment, the electronic device 12 may be comprised of a laser based measuring instrument 14 (discussed below in regard to FIG. 4) such as the device manufactured by Leica Geo Systems AG of Heerbrugg, Switzerland under the designation DISTO™ classic laser spot measuring device. However, other devices which utilize laser or other coherent light may be utilized. Those of skill in the art will appreciate that in the track and field environment, important functionality of such a device is the ability to accurately measure the distances associated with the various sports. Stand 13 may be a simple camera tripod, a surveyor's tripod or other stable platform which can cooperatively support the electronic device 12 in a stable manner—thereby providing for accurate measurements. Such a stand 13 can be constructed of aluminum, steel, plastic or other materials.

The target device 15 includes a target area 16 and a handle 17. In the preferred embodiment, a reflective surface for target area 16 is provided. The reflective surface helps insure that laser based electronic device 12 receives a strong return signal from a landing point 44 of a thrown object. Handle 17 is provided to permit a user to easily place target area 16 in a relatively stable fashion, and to properly mark landing point 44 of the thrown object (denoted by the "x" mark in FIGS. 2 and 3). In the preferred embodiment, handle 17 can be a single pole with a grip portion on top.

Figure 2:
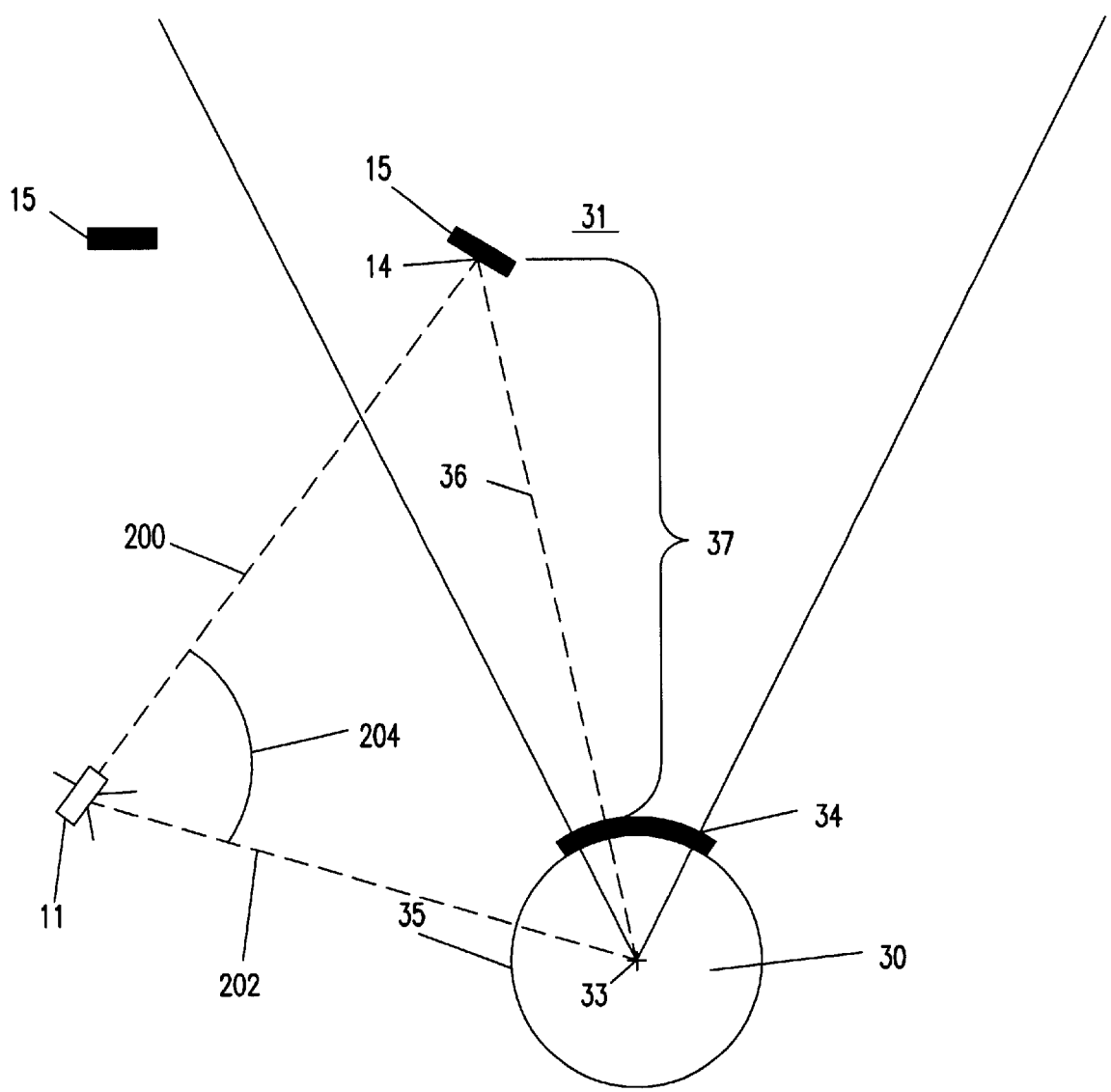
FIG. 2 is a diagrammatic figure illustrating the field event environment in which the principles of the present invention are employed.

Referring now to FIG. 2, measuring device 11 is located at a position offset from a throwing circle 30 and outside of a sector landing area 31. Circle 30 has a center point 33 and a fixed radius defining a scratch line 35. The radius of circle 30 may vary depending on the throwing event. Forming a portion of circle 30 adjacent sector 31 is a scratch board 34 which an athlete may touch during a valid throw but may not step across. The exact positioning of measuring device 15 is not fixed relative to circle 30 or sector 31 so long as lines of visibility are maintained between measuring device 11 and both circle 30 and sector 31. Following setup and initialization of measuring device 30 (described in further detail below), a user of measuring device 30 and a marker standing outside of sector 31 having target device 15 awaits a valid throw by an athlete. A valid throw occurs when the athlete remains within circle 30 while performing the throw and the thrown object falls within sector 31. Upon the fall of a valid throw, the marker enters the sector and places target device 15 so that target area 16 (shown in FIG. 1. above) is coincident with landing point 44 of the throw. Once target device 15 is correctly positioned the user at measuring device 11 aims the measuring device at target area 16 and records a data set for landing point 44. Using this throw data set, a horizontal throw distance 37 is determined. This distance is determined from scratch board 34 along a straight line 36 connecting center point 33 of circle 30 and landing point 44. The arrangement shown in FIG. 2 is applicable to shotput, discus and hammer throw events where the athlete must execute the throw from within a circular area. While two target devices 15 are shown in FIG. 2, it will be appreciated that only one target device 15 is required for the functioning of the present invention. Additional devices 15 may be used during an event to permit more rapid acquisition of throw distance 37 or to provide a backup should one of the target devices 15 be damaged.

Figure 3:
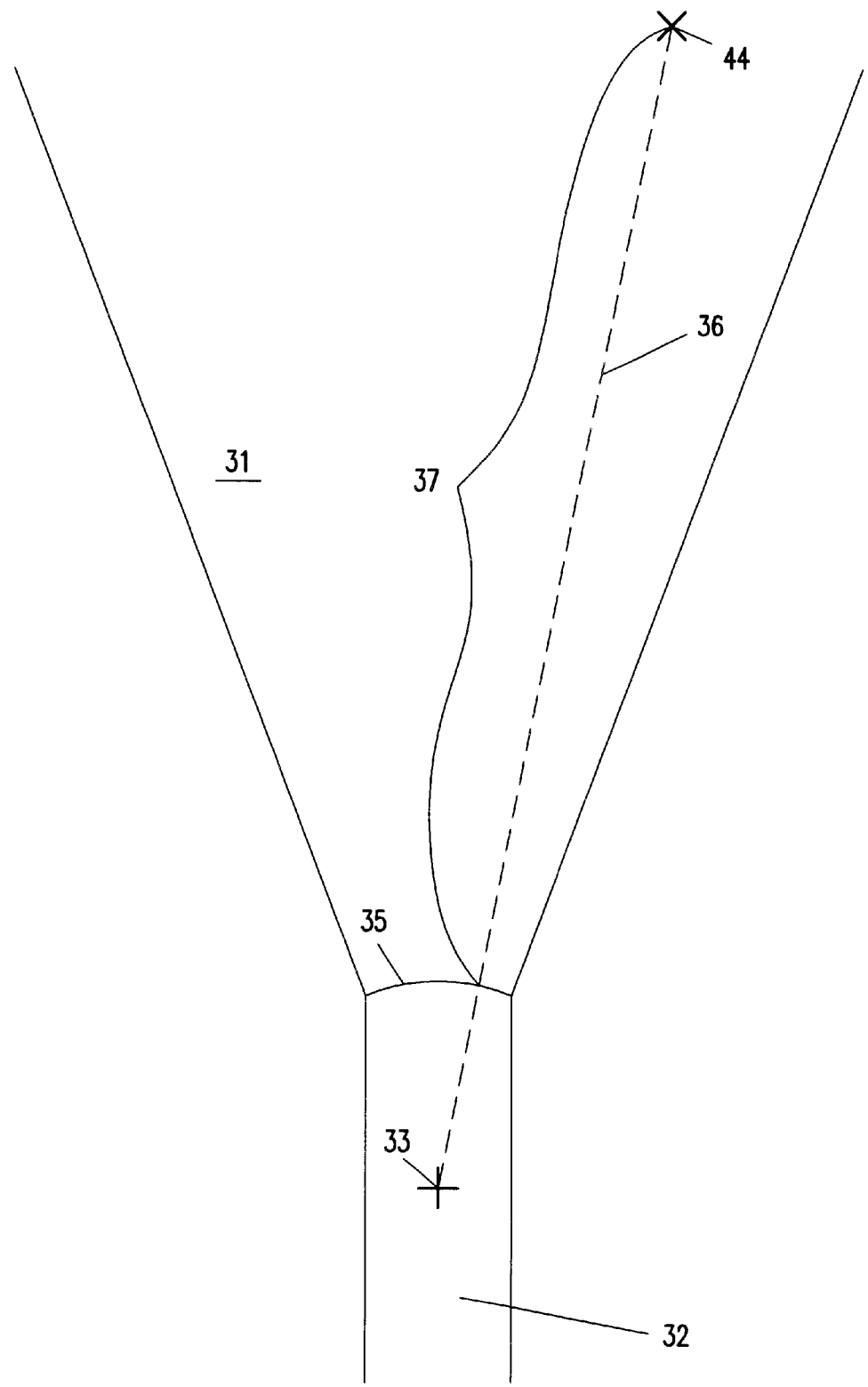
FIG. 3 is a diagrammatic figure illustrating the laser measuring device system in an alternative field event environment.

FIG. 3 illustrates the determination of throw distance 37 for the javelin, where the athlete must release the throw from a runway 32 having a scratch line 35 marking the end. Scratch line 35 describes a portion of an arc having a center point 33 and a fixed radius. Unlike the discus, shotput and hammer circles 30, runway 32 does not include a scratch board 34. Throw distance 37 is measured from scratch line 35 to landing point 44 along a straight line 36 from center point 33 to landing point 44.

Referring now to FIGS. 4 and 5, measuring device 11 is shown in more detail. Electronic device 12 includes measuring instrument 14, a processor housing 100, a horizontal plate 102, a tribrach 104, a vertical angle encoder 106, and a horizontal angle encoder 108. Processor housing 100 includes a vertical plate 110, a plurality of communication ports 112, a power switch 114, a data collection button 115 and a signal light 116. As shown, one of the communication ports 112 is attached to a cable 118 from measuring instrument 14. Vertical angle encoder 106 is mounted to vertical plate 110 and measures the relative rotational position of measuring instrument 14 about an axis 120. Electronic device 12 is pivotably mounted to tribrach 104 and rotates about axis 120. Horizontal angle encoder 108 is mounted to horizontal plate 102 and measures the relative rotational position of measuring instrument 14 about an axis 122. Measuring instrument 14 is pivotably mounted to vertical plate 110 and rotates about axis 122. Preferably, axis 120 and axis 122 are perpendicular with respect to each other and intersect at a point along an axis 124 of measuring instrument 14.

Tribrach 104 is preferably a standard surveyors tribrach which incorporates a level sensor such as one or more tubular level bubbles or a bullseye bubble. Tribrach 104 removably attaches electronic device 12 to tripod 13 and holds electronic device 12 such axis 122 is vertical when the level sensor indicates tribrach 104 is level.

FIG. 6 illustrates the logic flow 50 of the steps taken to set up measuring device 11 and perform the measurement of throw distance 37. At 51, the process starts. At block 52, tripod 13 is setup and electronic device 12 is mounted to tripod 13 at a location adjacent to but outside of circle 30, runway 32 and sector 31. At block 53, electronic device 12 is leveled on top of tripod 13. As described below, electronic device 12 incorporates a tribrach or similar device to permit the definition of a horizontal plane for electronic device 12. At block 54, electronic device 12 is powered up. At block 55, using a level sensing device such as a bubble tube, measurement instrument 14 is leveled. The value of vertical angle encoder 106 with measurement instrument 14 level is captured and used a reference or zero value for use in determining the vertical angle of datasets and reduction of measured distance to horizontal distance.

At block 56, the user is requested to select the units of output for distances measured by measuring device 11, either imperial or metric units. At block 57, the user is requested to select the event for which throws are being measured. This will ensure that the appropriate radius from center point 33 to scratch line 35 is used when computing throw distances. At block 58, the user is prompted to place target device 15 on center point 33, aim measuring instrument 14 at target area 16 and press button 115 to collect a zero dataset, as described below. At block 59, the user of measuring device 11 is awaiting a valid throw by an athlete.

Within processor housing 100 is a numerical processor. The processor is electrically connected with and capable of receiving and storing a reference or zero value reading from vertical angle encoder 106. The processor is also electrically connected with and capable of receiving and storing a center point dataset comprising values from vertical angle encoder 106, horizontal angle encoder 108 and measurement instrument 14 when target device 15 is placed at center 33, measuring device 11 is aimed at target area 16 and a distance is captured by measuring instrument 14 by pressing button 115. The processor is further capable of receiving a throw dataset comprising values from vertical angle encoder 106, horizontal angle encoder 108 and measurement instrument 14 when target device 15 is placed at landing point 44, measuring device 11 is aimed at target area 16 and a distance is captured by measuring instrument 14. From these two datasets, the processor is capable of determining a horizontal distance from center point 33 to landing point 44. Once a horizontal distance has been determined, the distance or radius from center point 33 to scratch line 35 is subtracted from this distance to compute throw distance 37. This value is displayed on an integral display in measuring device 14 or communicated to an external device such as a scoring computer or a score board via one of the communication ports 112.

At block 60, an athlete has executed a valid throw and the thrown object has landed at landing point 44. Target device 15 is placed at landing point 44 with target area 16 facing measuring device 11. Measuring instrument 14 is aimed at target area 16 and button 115 is pressed. A throw dataset comprising values from vertical angle encoder 106, horizontal angle encoder 108 and measurement instrument 14 is then captured. The throw dataset and the zero dataset are used to compute the horizontal distance between center 33 and landing point 44 in block 62. The radius appropriate for the event is subtracted from this distance to compute distance 37 from scratch line 35 to landing point 44 in block 63. In block 64, distance 37 is output to a display on measuring instrument 14 and potentially also to an external device or display separate from measuring device 11. At this point, if additional athletes will be throwing in the event, logic flow 50 loops back to block 59, as indicated by item B. If no other athletes or throws remain in the event, logic flow 50 ends at block 65.

In addition to the throwing event measuring functions described above, it is anticipated that measuring device 11 may also be provided with a zero radius or point-to-point distance program. The logic of this program is similar to that described in FIG. 6, above. However, this program does not depend on a valid throw occurring and does not include the radius subtraction of block 63. To operate this program, measuring device 11 is setup and leveled, units are selected and the point-to-point program is selected in block 57. Following that, target device 15 is placed at two points about measuring device 11, target area 16 is sighted at each point and a dataset is collected for each point. Upon collection of a dataset for the second point, the horizontal distance between the two points is computed by the processor and output to the measuring instrument or an external device for display. This program might useful in setting up equipment at specific locations, laying out apparatus for a meet, or verifying the layout of equipment or apparatus already in place. Additionally, this program could be used to measure between scratch boards and landing points in the leaping events, such as long jump or triple jump.

Figure 7:
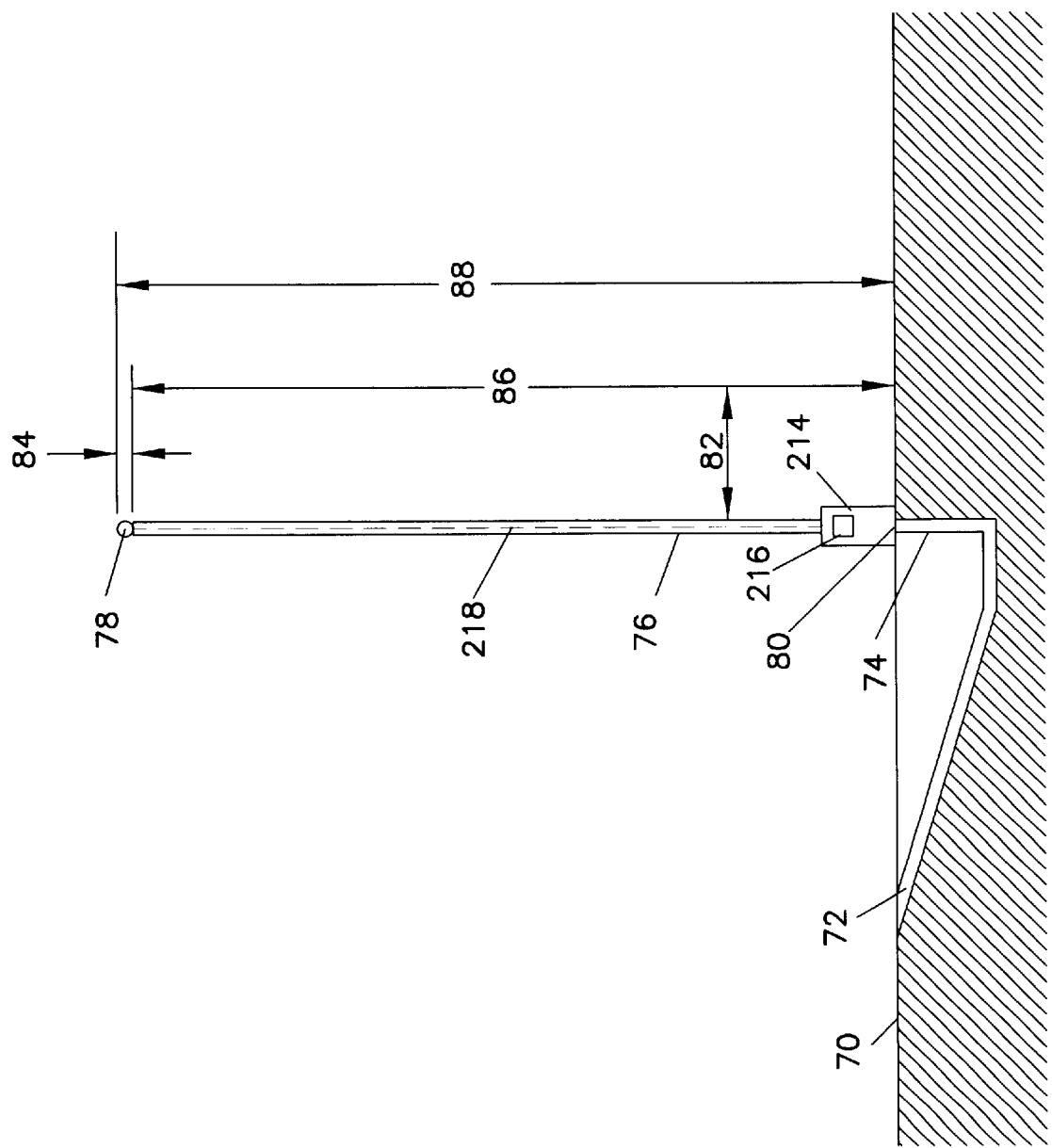
FIG. 7 is an alternative use of a measuring instrument in the environment of the present invention.

It is also anticipated that measuring instrument 14 could be used in a method to determine and verify the height of an overhead bar, such as used in the pole vault. Measuring instrument 14 can be removed from measuring device 11 and used as a stand-alone measuring device. FIG. 7 shows a cross-sectional view of an end of a pole vaulting runway 70, including vault box 72 for receiving an end of an athlete's vaulting pole. Vault box 72 includes an end wall 74 having a top edge 80 from which a height 88 of a bar 78 is determined. Bar 78 is held aloft at a specific height by a pair of standards 76 which are movable in the direction shown by arrow 82 to allow the bar to be properly positioned for each athlete and to be moved adjacent end wall 74 to placing bar 78 at a particular height.

To determine the height of bar 78, a diameter or vertical height 84 of bar 78 is measured. Standards 76 are moved so that standards 76 extend vertically on either side of end wall 74. Measuring instrument 14 is placed on top edge 80 so that the laser is directed vertically against the lower side of bar 78. A distance 86 from top edge 80 and the lower side of bar 78 is measured and displayed by measuring instrument 14. The user may then manually add diameter or height 84 of bar 78 to determine height 88 to the top of bar 78 for competition scoring purposes. Alternatively, diameter or height 84 of bar 78 may be input into an offset distance program within measuring instrument 14 so that it is automatically added to distance 86 measured by measuring instrument 14 so that height 88 of the top of bar 78 is displayed. This method is also applicable to high jump bar height measurement.

In order to assist the alignment of the measuring device 11 with the target device 15, a viewfinder may be utilized in connection with the target device 15 and/or the measuring device 11. Examples of view finders include a telescope axially aligned with the measuring means on measuring instrument 14, the telescope having cross hairs which when placed on target area 16 will ensure that measuring instrument 14 is measuring a distance to target area 16.

It will be appreciated that the principles of this invention apply to the system and method of using a laser distance measuring device to calculate distances of thrown objects in a track and field event. While a particular embodiment of the invention has been described with respect to its application, it will be understood by those skilled in the art that the invention is not limited by such application or embodiment or the particular components disclosed and described herein. It will be appreciated by those skilled in the art that other components that embody the principles of this invention and other applications therefor other than as described herein can be configured within the spirit and intent of this invention.

The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. A method for measuring distances in a throwing event at a track and field meet, the steps comprising:
   a. placing a marker at a center of curvature for a scratch line, the scratch line defining a radius of curvature of an area where a throw will originate; pointing a target located on the marker toward a laser distance measuring device setup in a position offset from the area where the throw will originate; aligning the laser distance measuring device with the target; and collecting a first dataset corresponding to the vertical angle, the horizontal angle and the distance between the laser distance measuring device and the center of curvature;
   b. placing the marker at a point where a thrown object in the throwing event lands;
   c. pointing the target located on the marker toward a the laser distance measuring device setup in a position offset from the area where the throw originated;
   d. aligning the laser distance measuring device with the target; and collecting a second dataset corresponding to the vertical angle, the horizontal angle and the distance between the laser distance measuring device and the thrown object; and
   e. determining the distance of the thrown object from the center of curvature of the scratch line of the area where the throw originated by comparing and processing the values within the first and second datasets.

2. The method of claim 1, further comprising the step of subtracting the radius of curvature of the scratch line from the distance determined.

3. The method of claim 2, further comprising the step of programming the measuring device to automatically subtract the radius of curvature of the scratch line from the distance determined.

4. The method of claim 1, wherein the distance determined is a horizontal distance.

5. The method of claim 3, wherein the throwing event is one of shot put, discus, javelin and hammer throw.

6. An apparatus for measuring distances in a throwing event at a track and field meet, the apparatus comprising:
   a. a marker, the marker having a target located thereon;
   b. a laser distance measuring device arranged and configured to be placed in a position offset from an area where the throw originated, the area having a curved scratch line defining a center of curvature and a radius;
   c. wherein the laser distance measuring device is aligned with the target placed at the center of curvature and a first measurement dataset collected, and the laser distance measuring device is then aligned with the target placed at a point where a thrown object landed and a second measurement dataset collected and utilizing the first and second datasets a processor, included with the laser distance measuring device determines the distance that an athlete throws the thrown object from the center of curvature of the scratch line.

7. The apparatus of claim 5, wherein the radius of curvature of the scratch line is subtracted from the distance determined.

8. The apparatus of claim 6, further comprising determining means, associated with the measuring device, for automatically subtracting the radius of curvature of the scratch line from the distance determined.

9. The apparatus of claim 5, wherein the distance determined is a horizontal distance.

10. The apparatus of claim 5, wherein the throwing event is one of shot put, discus, javelin and hammer throw.

11. A method of measuring a distance of a thrown object during a field event comprising the steps of:
    a. providing a distance measuring device rotatably mounted to a stand and rotatable about a first axis, the distance measuring device including a measuring instrument rotatably mounted to the distance measuring device and rotatable about a second axis perpendicular to the first axis, and an on-board processor with data storage;
    b. setting up the stand at a position offset from and adjacent to a throwing area and a landing area, and arranging the stand so that the first axis is generally vertical and the second axis is generally horizontal;
    c. collecting and storing in the distance measuring device a first dataset including a first distance measured by the measuring instrument, a first relative position of the distance measuring device about the first axis and a first relative position of the distance measuring device about the second axis, when the distance measuring device is aimed at a target area positioned at a center of curvature of a scratch line of the throwing area;
    d. collecting and storing in the distance measuring device a second dataset including a second distance measured by the measuring instrument, a second relative position of the distance measuring device about the first axis and a second relative position of the distance measuring device about the second axis, when the distance measuring device is aimed at a target area positioned at a landing point of a thrown object within the landing area; and
    e. using the processor to calculate a horizontal distance between the center of curvature of the scratch line of the throwing area and the landing point from the first and second datasets.

12. The method of claim 11, further comprising the step of subtracting a radius of curvature of the scratch line from the horizontal distance calculated by the processor to determine a throw distance from the scratch line to the landing point.

13. The method of claim 12, further comprising the step of communicating the throw distance to a display device included on the distance measuring device.

14. The method of claim 12, further comprising the step of communicating the throw distance to an external display device.

15. The method of claim 12, further comprising the step of communicating the throw distance to an external data capture device.

16. The method of claim 11, wherein the field event is one of shot put, discus, javelin and hammer throw.

17. A method of measuring the height of a cross bar in a jumping event at a track and field meet comprising the steps of:

a. positioning a pair of standards supporting the cross bar so that the cross bar is directly above a reference point;
b. placing a laser distance measuring device at the reference point;
c. collecting a vertical distance between the reference point and a lower edge of the cross bar with the laser distance measuring instrument; and
d. adding a distance between the lower edge of the bar and an upper edge of the bar to the vertical distance to determine the height of the bar above the reference point.

18. The method of claim 17, wherein the jumping event is the pole vault and the reference point is an upper edge of a vault box.

19. The method of claim 17, wherein the laser distance measuring device includes a data storage which stores the distance between the lower edge of the bar and the upper edge of the bar, a processor which computes the height of the bar above the reference point, and a means of displaying the height.

* * * * *

UNITED STATES PATENT AND TRADEMARK OFFICE
CERTIFICATE OF CORRECTION

PATENT NO.     : 6,714,284 B2
DATED          : March 30, 2004
INVENTOR(S)    : Norman et al.

It is certified that error appears in the above-identified patent and that said Letters Patent is hereby corrected as shown below:

Column 1,
Line 16, "the discuss," should read -- the discus, --
Line 20, "javelin, discuss, shut put" should read -- javelin, discus, shot put --

Column 3,
Line 35, "DISTO™ classic laser" should read -- DISTO™ laser --

Column 5,
Line 17, After "area 16" insert -- (as indicated by Line 202 in FIG. 2) --
Line 38, after "landing point 44." insert the following paragraphs:
-- To determine the horizontal distance between center point 33 and landing point 44, the processor compares and processes the values within the center point dataset and the throw dataset. First, a measured distance 210 (shown in FIG. 1) between device 11 and landing point 44 is reduced to a horizontal distance 200 (shown in FIG. 2) using the difference between the value captured from the vertical angle encoder in the throw dataset and the reference value of the vertical angle encoder when measuring instrument 14 is level. Similarly, the measured distance between device 11 and center point 33 is reduced to a horizontal distance 202 (shown in FIG. 2) using the difference between the value captured from the vertical angle encoder in the center point dataset and the reference value of the vertical angle encoder when measuring instrument 14 is level. Note that the values recorded from the vertical angle encoder in each dataset correspond to an angle 206 which measuring instrument 14 is inclined or declined from a horizontal Line 208 (shown in FIG. 1).

Along with the reduction of the measured distances to horizontal distances 200 and 202, a horizontal angle 204 (shown in FIG. 2) is calculated from the difference in the values recorded from the horizontal angle encoder in each of the center point and throw datasets. Using basic trigonometric functions, horizontal distance 36 from center point 33 to throw point 44 can be calculated from horizontal distance 200 and 202 and angle 204.

To calculate the distance 36 between center point 33 and throw point 44, the following equation may be used:
$$36 = ((202 - (200\cos 204))^2 + (200\sin 204)^2)^{1/2}$$ --
Line 39, "Once a horizontal distance has" should read -- Once a horizontal distance 36 has --

UNITED STATES PATENT AND TRADEMARK OFFICE
CERTIFICATE OF CORRECTION

PATENT NO. : 6,714,284 B2
DATED : March 30, 2004
INVENTOR(S) : Norman et al.

It is certified that error appears in the above-identified patent and that said Letters Patent is hereby corrected as shown below:

Column 6,
Line 36, "Measuring instrument 14 is placed" should read -- A measuring instrument 214, similar in function to measuring instrument 14 above, is placed --
Line 38, "lower side of bar 78." should read -- lower side of bar 78 as indicated by. dashed line 218 and reflected back to instrument 214. --
Line 39, "measuring instrument 14. The user" should read -- measuring instrument 214 on a display 216 on the side of the instrument. The user --
Lines 44 and 45, "measuring instrument 14 so that" should read -- measuring instrument 214 so that --
Line 45, "measuring instrument 14 so that" should read -- measuring instrument 214 so that --

Column 7,
Line 22, "toward a the" should read -- toward the --
Line 57, "dataset collected, and the" should read -- dataset is collected; the --.
Line 60, "dataset collected and utilizing" should read -- dataset is collected; and, utilizing --
Line 61, "second datasets a processor, included" should read -- second datasets, a processor, included --
Line 62, "measuring device determines" should read -- measuring device, determines --

Signed and Sealed this

Twenty-seventh Day of July, 2004

JON W. DUDAS
*Acting Director of the United States Patent and Trademark Office*